Oct. 17, 1950  J. MERCIER  2,526,252
HYDRAULIC CONTROL MECHANISM
Filed March 20, 1944  3 Sheets-Sheet 2
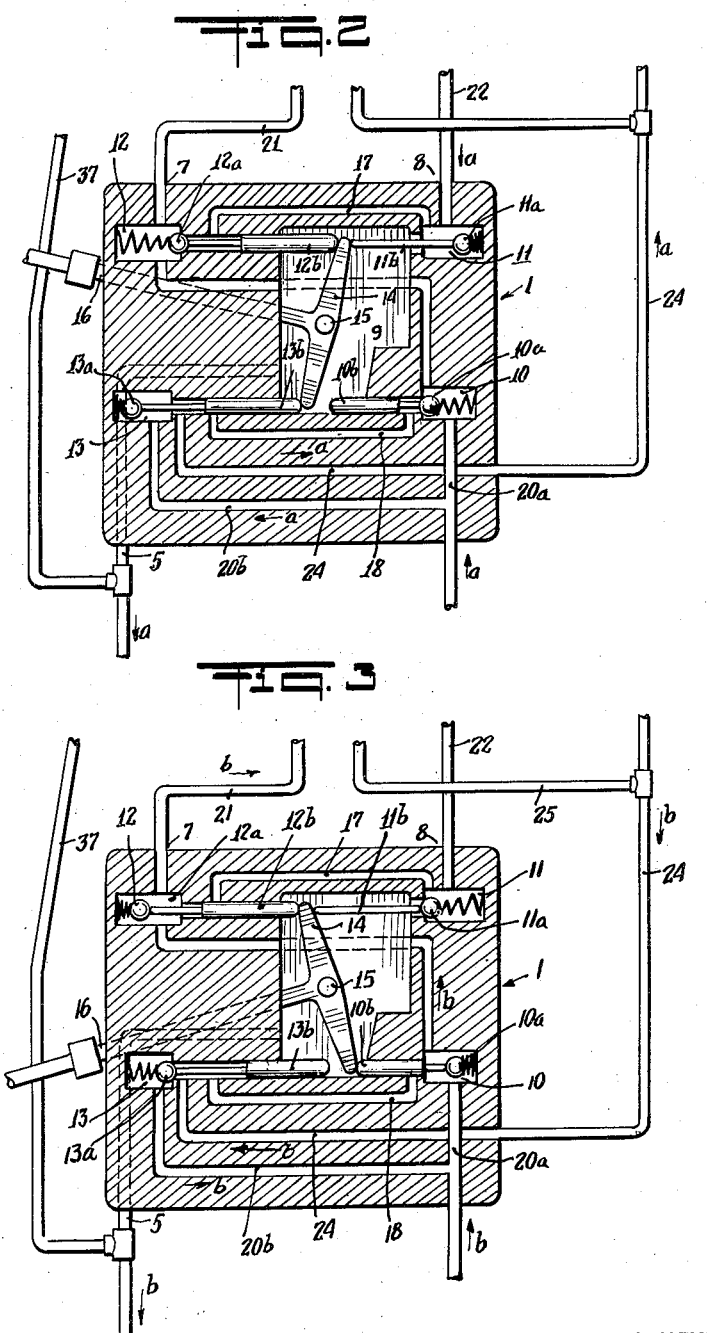
INVENTOR.
Jean Mercier
BY
Howard T. Jeandron
ATTORNEY

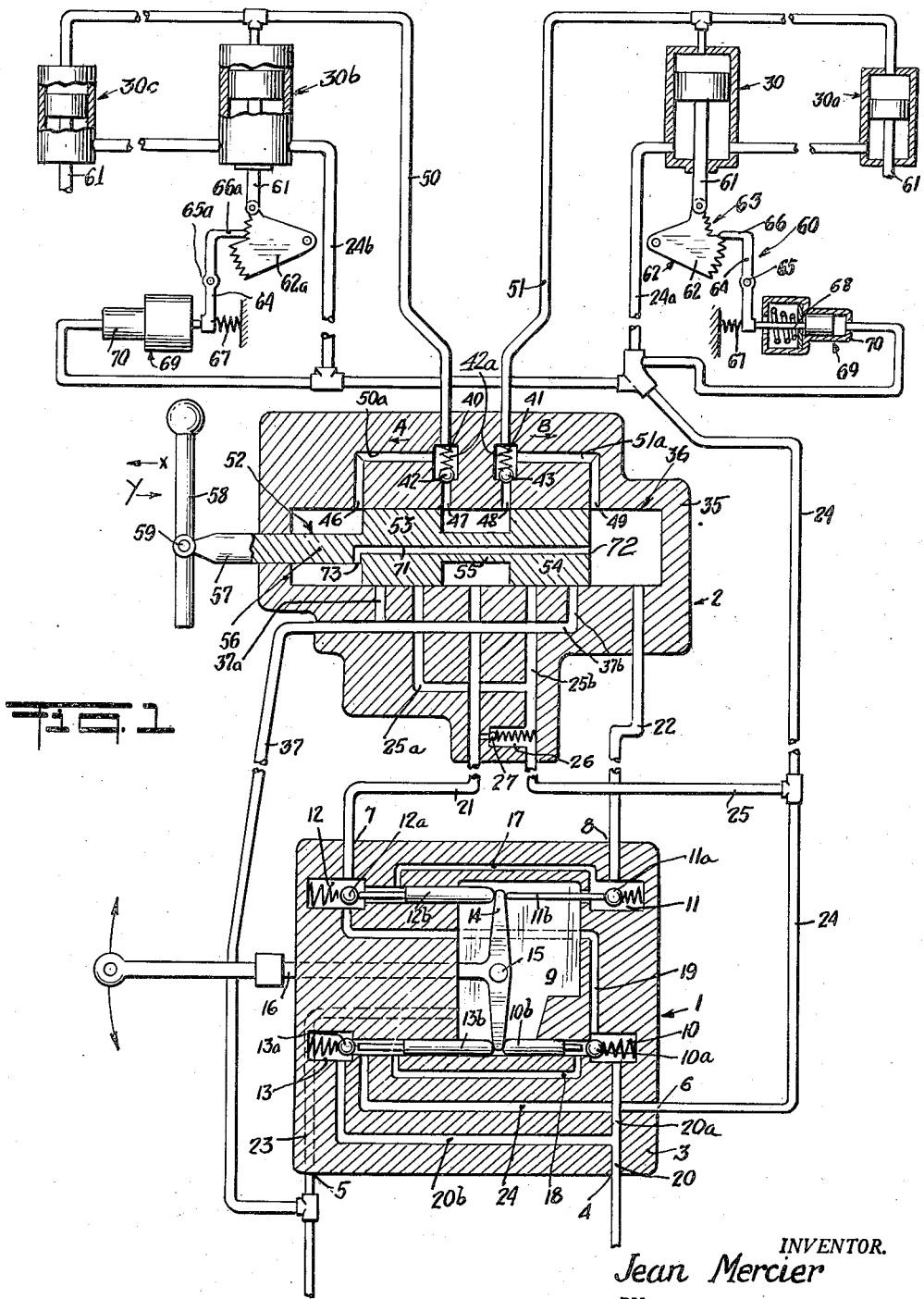

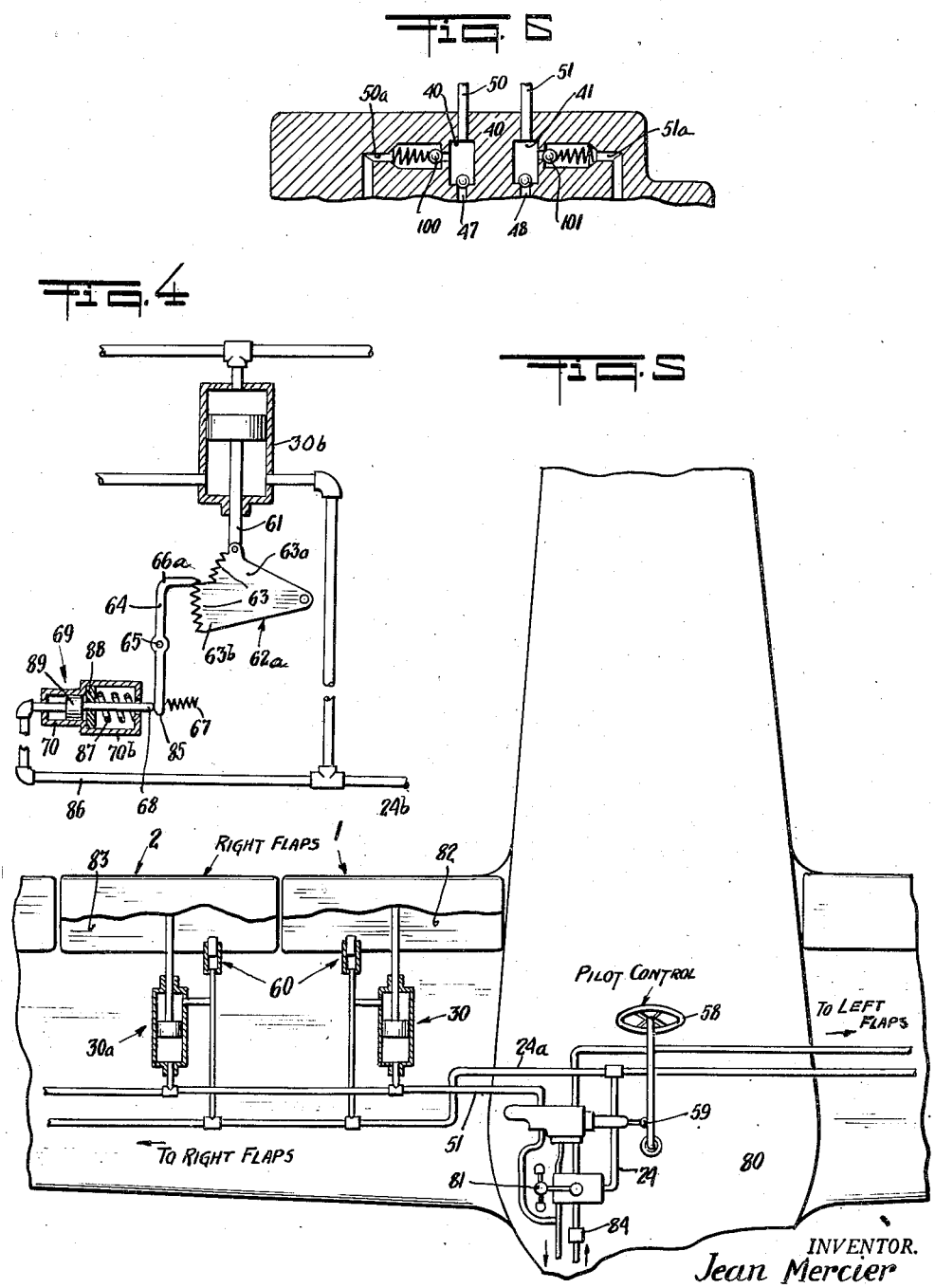

Patented Oct. 17, 1950

2,526,252

UNITED STATES PATENT OFFICE 2,526,252

HYDRAULIC CONTROL MECHANISM

Jean Mercier, New York, N. Y.

Application March 20, 1944, Serial No. 527,198

3 Claims. (Cl. 60—97)

The present invention pertains to a mechanism for controlling the automatic action of two or more servomotors, each actuating one of two or more devices on a machine which are intended to be simultaneously and correspondingly operated, and this alternatingly in opposite directions. Such devices may be wing flaps, landing struts or the like on aircraft, brakes on a vehicle or, for instance, appliances actuating a press head in a stationary unit. The present invention is applicable to any case in which pairwise associated auxiliary devices are provided on a machine in such manner that their failure to operate concomitantly will cause a disturbance in the operation of the machine which will be corrected by the operator of said machine by means of a displacement of the general controls of the same.

It is the object of the present invention to provide a control mechanism including a distributing unit operatively connected to the general controls of the machine and being adapted to distribute actuating energy to the individual servomotors in accordance with the position of said general controls so that, when the latter are displaced by the operator—to correct a disturbance in the operation of the machine, or in order to alter the direction of travel or any other condition of the same—then, said servomotors will be automatically and differentially actuated so as to cause said devices to assist in achieving the desired condition of the machine.

To that end, the control mechanism, according to the present invention, includes a master control unit which controls the flow of actuating energy to and from all devices. The mechanism further includes a distributor unit operatively connected to the general controls of the machine and which controls the distribution of energy to each individual servomotor.

It has already been suggested to provide on a machine a combination of hydraulic elements including a master valve, a distributor valve and two fluid actuated devices in which the distributor valve is operatively connected with the general controls of the machine. This arrangement permits an operation of the distributor valve whereby the flow to or from one of the servomotors may be cut off while the condition of the other servomotor is not affected. Such an arrangement is, for instance, described in Patent 2,312,432 issued March 2, 1943.

The control system, according to the present invention, is improved inasmuch as the operation of the distributor unit will always, and preferably progressively, accelerate one of the servomotors while the other will first be cut off from the flow of actuating energy and will be, then, in the event of an extreme displacement of the general controls of the machine, supplied with energy but so as to actuate it in the opposite direction.

The present invention also includes the provision of a locking mechanism which greatly facilitates the correct operation of wing flaps or the like.

Further features of the present invention will become apparent from the following description of embodiments thereof given by way of example and illustrated in the accompanying drawings.

The illustrated embodiments show the present invention applied to the control of the wing flaps of an airplane.

Figs. 1–3 show, in section, the structure of a control system, according to the present invention, using hydraulic pressure fluid as motive energy, the various pipe connections being schematically indicated.

In these figures, Fig. 1 shows the master and the distributor valves which are the principal elements of the control system in their neutral position, i. e. that in which the flaps are stationary.

Fig. 2 shows the master valve in a position which may be used for lowering the flaps and Fig. 3 shows a position which may be used for raising the flaps.

Fig. 4 shows, in section, details of the locking mechanism illustrated in Fig. 1, and Fig. 5 is a schematic view illustrating the installation of a hydraulic control system according to Figs. 1 to 3 on an airplane, and, Fig. 6 is a schematic section of a modified detail of the control mechanism according to Figs. 1 to 3.

In Fig. 1 the control unit comprises a master valve 1 and a distributor valve 2. Master valve 1 is housed in a casing 3. There are provided in casing 3 an inlet port 4 connected to a source of pressure fluid, a discharge port 5 connected to an exhaust line and three distributing ports 6, 7, 8. Inside casing 3 there is provided a central valve chamber 9 and four auxiliary valve chambers 10, 11, 12, 13. Balls 10a, 11a, 12a, 13a associated with chambers 10—13 control flow of fluid therethrough. Balls 10a to 13a are, in turn, controlled through interposed rods 10b, 11b, 12b, 13b by a cam 14 pivotally mounted at 15 in chamber 9 and adapted to be displaced from the outside by means of a lever 16. Chambers 10, 13, 10, 12 and 11, 12 communicate pairwise with each other through conduits 18, 19 and 17, respectively. Port 4 communicates with chambers 10 and 13 through conduits 20, 20a and 20b. Chambers 11 and 12 communicate with ports 7 and 8, respectively, and, through conduits 21 and 22 with distributor valve 2. Conduit 23 connects chamber 9 to port 5. Conduits 24, 24a, 24b, 25, 25a and 25b connect chamber 13 to valve 2 and to one side of hydraulic jacks 30, 30a, 30b and 30c which are so mounted on the aircraft that each piston rod controls the operation of one wing flap.

Distributor valve 2 comprises a casing 35 housing a cylinder bore 36. Bore 36 communicates on one side thereof with the exhaust through conduits 37, 37a and 37b, with chambers 11 and 12 of valve 1 through conduits 21 and 22, respectively, and with conduit 24 through conduits 25, 25a, and 25b.

Conduits 21 and 25 communicate with each other through a passage 26 but a check valve 27 prevents flow from conduit 25 into conduit 21.

On the opposite side of bore 36, there are provided four distributing ports 46, 47 and 48, 49 which are pairwise connected to chambers 40 and 41, respectively. Conduits 50 and 51 connect valve 2 to the other end of jacks 30, 30a and 30b, 30c. Mounted in chambers 40 and 41 are balls 42 and 43, each backed by a compression spring 42a, to give them the function of check valves operative to permit flow from conduit 21 into chambers 40 and 41 en route to conduits 50 and 51 as presently explained, but serve to prevent return flow from the chambers to such conduit 21, the balls having no controlling effect on the entrances to conduits 50 and 51.

Inside bore 36, there is provided a movable valve element including two piston like portions 53, 54 which slidably engage the wall of bore 36 and two recessed portions 55, 56, the latter carrying an extension 57 projecting to the outside of casing 35.

Projection 57 is operatively connected to the steering rod 58 of the airplane as shown at 59.

Suitable sealing means (not shown) are interposed between projection 57 and casing 35.

A passage 71 extending through element 52 in the axial direction opens at both ends 72 and 73 into the interior of casing 35.

The control system may further include a locking mechanism shown at 60 which will be described in detail in connection with Fig. 4. If the locking mechanism is to be used each piston rod 61 associated with jacks 30 and 30b may be secured to a cam 62 which controls one of the flaps. Cam 62 has a serrated face 63. Facing cam 62, there is arranged a lever 64 pivoted at 65. Lever 64 carries a pin 66 adapted to engage face 63 and thus to prevent movement of cam 62. There are acting on lever 64 a spring 67 and a piston rod 68 projecting from a hydraulic jack 69 whose cylinder 70 communicates with conduit 24a or 24b. Spring 67 urges lever 64 to turn so as to apply pin 66 against face 63 and rod 68 urges the same in the opposite direction whenever conduits 24a or 24b are under pressure. Accordingly, whenever the pressure in conduits 24a, 24b is insufficient to overcome the strength of spring 67 pin 66 prevents any movement of cam 62 and the corresponding flap is rigidly locked.

When member 14 is in the neutral position of Fig. 1, conduits 24a and 24b communicate through conduits 24 and 18, chamber 10, conduit 19, chamber 12, conduit 17, chambers 11 and 9, and conduit 23, and hence with the exhaust. Ball 10a will of course be unseated to provide communication between conduit 18 and chamber 10, this by reason of fluid pressure upon the ball rather than by action of rod 10b upon it. Hence, the pressure in cylinders 70 will be insufficient to cause the pistons therein to actuate members 62, and the flaps which they control will remain locked.

Locking mechanism similar to those associated with jacks 30, 30a may, of course, be used in connection with jacks 30b and 30c.

The operation of the control system will now be described.

When the flaps are to be lowered the pilot will move lever 16 to displace cam 14 into the position shown in Fig. 2. This will cause fluid to flow, as indicated by arrows a, through port 4, chamber 13 and conduits 24, 24a and 24b into one side of jacks 30, 30a; 30b, 30c from which fluid is exhausted, on the other side, through conduits 50, 51, then through ports 46, 49, passage 71 of distributor valve 2, and, finally, through port 8, chambers 11, 9, conduit 23 and port 5 of master valve 1. The pressure prevailing in conduits 24a and 24b will cause the unlocking of mechanisms 60, all pistons will be displaced from one end to the other of jacks 30, 30a and this will cause a simultaneous and concomitant lowering of the flaps. In this position of element 14 conduits 25, 25a are under pressure but the same has no action on the system because element 52 of valve 2 obstructs, in its illustrated neutral position, (Fig. 1), the inlet openings of said conduits into bore 36. It should further be understood that under the conditions set up in Fig. 2 it will be impossible for the liquid to flow under pressure through conduit 19, chamber 12, conduit 21, bore 36, ports 47 and 48, chambers 40 and 41, and conduits 50 and 51 to the other side of the jacks for the reason that any such flow would instantly unseat balls 42 and 43 from the positions which they are shown to occupy in Fig. 1 and communication is thereby provided between chambers 40 and 41 on the one hand and conduit 22 on the other hand through conduits 50a and 51a, ports 46 and 49, bore 36 and passage 71. Conduit 22 is an outlet conduit and it will be noted in Fig. 2 that ball 11a is unseated to permit passage of fluid from outlet conduit 22 to outlet conduit 5 through chambers 11 and 9 and conduit 23. When it is desired to raise the flaps, it will be noted in Fig. 3 that ball 11a is in closed position between chambers 11 and 9 so that conduit 22 cannot serve as an outlet for the fluid which enters chambers 40 and 41. Hence it is that under the conditions set up in Fig. 3, the fluid passes up through conduits 50 and 51 to the upper ends of the cylinders, thereby causing a downward movement of the pistons and a consequent raising of the flaps.

In the event of a disturbance occurring in the operation of the flaps the plane will loose its balance and the pilots will operate rod 58 in the usual manner to recover the same by actuation of the ailerons. According to the present invention, since rod 58 is operatively connected to distributor valve 2 the normal displacement of said rod will, automatically, displace element 52 of valve 2 and this will change the flow of pressure fluid to the jacks causing them to move so as to adjust the relative position of all flaps in such manner as to assist in rebalancing the plane. Inversely, when rod 58 is displaced, at a time when the operation of the flaps is normal, in order to create an unbalanced condition of the plane, by action on the ailerons, then, the automatic displacement of element 52 will cause a differential operation of jacks 30, 30a and 30b, 30c whereby the flaps will be actuated, so as to assist in achieving the desired condition of the plane.

The effect of displacements of element 52 will best be understood by the following description of a definite example.

Assuming that, due to some accidental cause, the right hand flaps, associated with jacks 30, 30a are harder to operate than the left hand flaps, then, when valve 1 is shifted from neutral into lowering position (Fig. 2), the flaps associated with jacks 30b, 30c will drop more quickly than those controlled by jacks 30, 30a. The plane will careen to the right. The pilot will, at first moderately, displace rod 58 to the left (arrow $x$) to recover the balance of the plane by action on the ailerons. The resulting displacement of element 52 will, first, cause portion 53 to obstruct port 46. Thus, further discharge through conduit 50 will be impossible, jacks 30b, 30c and the associated flaps will be stopped. Jacks 30, 30a, on the other hand, will be accelerated since the cessation of flow of pressure fluid into jacks 30b, 30c will cause an increase of pressure. If the disturbance continues, the pilot will further displace rod 58 in the same direction until it reaches an extreme position. Accordingly, element 52 will, also, assume an extreme position toward the left. This will cause portion 53 to uncover the outlet opening of conduit 25a so that pressure fluid will flow through port 47 and conduit 50 toward the other end of jacks 30b, 30c. The pistons associated with said jacks will thus, be subjected to pressure on both sides, but, due to the difference in area between the two faces of said pistons the same will be displaced toward the end of said jacks adjacent conduit 24b. The fluid expelled from the jack during this movement returns through conduits 24b, 24, 25. Accordingly, jacks 30b, 30c will be reversed while jacks 30, 30a continue to be actuated in the original direction. This differential actuation of the jacks will bring the advanced flaps, in the shortest possible time, back into line with the slow flaps.

Fig. 3 shows the position for raising the flaps. In the neutral position of element 52 of valve 2 pressure fluid will enter the system through port 4 and circulate as indicated by arrows $b$. Fluid pressure will be supplied to all jacks through conduits 21, 50 and 51, tending to expel the pistons from their associated cylinders. Due to the larger area of the piston faces opposite piston rods the fluid pressure prevailing in the cylinder portion adjacent conduits 24a, 24b will be somewhat superior to that prevailing in the portion adjacent conduits 50, 51. Accordingly, fluid is expelled from the jacks through conduits 24a, 24b, returns through conduit 24 to chamber 13, lifts ball 13a and reenters the pressure line through conduit 20b.

It is a particular feature of the present invention that, at the operation of the flaps in one direction, in this case at the raising thereof, the pressure fluid which is expelled from one side of the jacks returns to the other side of the same so that the total amount of pressure fluid which has to be supplied to the system is limited to a volume equal to that of the portions of the piston rods which are extended out of the jacks during this operation.

Assuming that, in the case illustrated by Fig. 3, again the conditions arise which were described above in connection with Fig. 2, then, the flaps associated with jacks 30b, 30c will rise faster than the others. The aircraft will careen to the left and rod 58 will be shifted to the right (arrow $y$). A moderate displacement in that direction will carry element 52 into a position in which portion 53 obstructs port 47. Thus, jacks 30b, 30c are cut off from any supply so that the associated flaps—which were fast—are stopped while an increased pressure acts on jacks 30, 30a tending to raise the flaps associated therewith. An extreme displacement of rod 58 will displace element 52 so far that the opening of conduit 37 into bore 36 is uncovered. Pressure fluid can, then, be exhausted through conduit 50, port 46 and conduit 37. This causes the pressure prevailing in conduit 24b to reverse the operation of jacks 30b, 30c so that the flaps associated with the same are lowered while the flaps associated with jacks 30, 30a continue to rise. This will, again, return the flaps, in the shortest possible time, into a concomitant position.

Fig. 4 shows the locking mechanism more in detail. The serrated surface of cam 62a is divided into two portions 63a and 63b, the latter projecting beyond the former.

Cylinder 70 communicates with conduit 24b (24a) through a conduit 86.

When the locking mechanism is to be used the control system will include a pressure reducer valve 84 (Fig. 5) or the like.

In operation, when springs 67 and 87 are fully extended pin 66 is engaged in one of the serrations of cam 62a and the same is locked. When fluid pressure is fed to cylinder 70 piston 89 is urged outwardly. Preferably, the dimensions of members 62 and 66 and the strength of spring 67 are so selected that pin 66a is clear of portion 63a when piston 89 comes to engage annular shoulder 88 on which spring 87 is supported. In this manner, as long as the fluid pressure does not exceed a predetermined value cam 62a will be free for limited movement only since pin 66a will still engage portion 63b of the same. However, when the fluid pressure becomes strong enough to compress both springs 67 and 87, then, pin 66a will be completely withdrawn and cam 62a will be free.

Locking mechanisms according to the present invention can be used to advantage whenever differential pressure is used in hydraulic systems to displace parts of a machine into a predetermined position. It is an important advantage of this mechanism that one supply and one return line will take care as well of the actuation of the device as of the lock. This affords an economy of weight which, in case of aircraft, may be of commanding interest.

Thus, for instance, when the plane is being prepared for flight the control system may be supplied with fluid under, say half the usual operating pressure to lower the flaps. Assuming that the yielding means (springs 67, 87) have been correctly adjusted and the cam faces correctly dimensioned, then, the locking mechanism will stop the descent of the flaps when they are halfway down, i. e. in the correct position for the take-off. In this manner, no surveillance of the flap movement is necessary during the preparation of the plane. The operator has merely to turn on the reduced pressure and no further attention is required. Regardless of the time at which he returns to shut the pressure off the flaps will not exceed the desired position. On planes having a plurality of flaps this is an important advantage.

By increasing the number of projecting portions of the cam and by providing means to supply the system with fluid under stepwise varying pressure it becomes possible to determine in advance the position into which the flaps will be lowered when the control system is supplied with fluid under a predetermined pressure. In this manner, the present invention may be used to insure, automatically, an appropriate lowering of the flaps into take-off, landing and even dive-bombing position.

While the operation of the locking mechanism has been explained above in connection with the lowering of wing flaps the relationship between the cam and the flaps may, of course, be reversed so that the various locking positions are reached during the raising operation.

In Fig. 5 the pilot's cockpit is at 80. Grip 81 is secured to lever 16 of master valve 1 and by actuating the same in opposite directions the flaps are lowered or raised. The steering rod 58 is shown connected at 59 to extension 57 of valve 2.

Conduits 24, 24a and 51 connect jacks 30, 30a and the locking mechanisms 60 associated with the same (partly shown) to valves 1 and 2 in the manner described in connection with Figs. 1–3. Jacks 30, 30a control with the interposition of cams 62 (not shown) wing flaps 82, 83. The arrangement is duplicated on the other side of the plane (not shown).

A simple or multiple pressure reducer valve 84 or the like may be provided in the supply line of the control system so that port 4' may be fed fluid under varying pressure, as it may be required for the usefulness of the locking mechanism.

The operation of the flaps is sometimes disturbed by backlash and excessive vibrations. To remedy that shortcoming it is advisable to include in the control system means which will cause jacks 30—30c to be subjected to pressure in both directions whenever the same are to be operated. This may be achieved for instance, in the manner shown in Fig. 6 by inserting spring loaded non return valves 100 and 101 into branches 50a and 51a of conduits 50, 51.

When the control system is arranged, as explained above, so that the jacks, when operated, are always subjected to pressure in both directions, then, locking means may also be associated with conduits 50, 51 so that the flaps are firmly locked except when pressure fluid is supplied to conduits 50, 51 or 24. With such an arrangement the flaps can not move when any one of the said conduits is injured so as to let fluid escape and that is particularly desirable when the ailerons are mounted on the extremity of the flaps.

While the invention has been described in connection with a hydraulic embodiment in which the extension of jacks 30, 30c corresponds to the raising of the flaps and the retraction of the jacks to the lowering of the flaps, this relationship may, of course, be reversed without any change in the control system. As described, the raising of the flaps requires the introduction of less fluid into the system than the lowering of the same. Accordingly, in the event of a deficiency occurring in the supply of fluid, the raising of the flaps may still be possible although, the supply of fluid may not be sufficient to accomplish a lowering of the same.

Also, when the described system includes the locking mechanism the flaps may still be raised even if conduit 50 or 51 is injured. But, if conduit 24a or 24b are injured, the flaps may not be lowered although conduit 50 or 51 may be intact because the locking mechanism cannot be released.

Both these features tend to make the raising of the flaps the safer of the alternating operations of the same. If the relationship between jacks and flaps is reversed, then, the lowering of the latter may still be possible even if the aircraft has been injured to an extent which may prevent the raising of the flaps.

The choice as to whether the extension of the jacks is coordinated to the raising or lowering of the flaps, and, accordingly, the retraction of the former to the lowering or raising of the latter, will depend upon the importance which is attached, in an emergency, to the possibility of continuing flight or to that of making a safe landing.

While the invention has been explained in connection with an airplane having a couple of flaps on either side it is obvious that the number of flaps (or other devices governed by a control system according to the present invention) on each side may be reduced to one or increased to more than two without departing from the spirit of the invention.

It is, also, evident that when the jacks are operated with fluid pressure acting on both faces of the respective pistons, then, the dimensions of said jacks must be suitably selected so that the effective force, resulting from the fluid pressure in opposite directions, is always sufficient to cause the desired movement.

The foregoing description is not intended to limit the present invention which extends to all changes, modifications and equivalents within the scope of the appended claims.

I claim:

1. Hydraulic mechanism for operating two servo-motors, said mechanism comprising a master-control valve-casing which has master ports; a distributor valve-casing which has distributor ports; conduits which connect said master-ports to said distributor valve-casing; conduits which connect said distributor ports to said servo-motors; a pipe which is connected at one end to a source of liquid under pressure and which is connected at its other end to said master-control valve-casing; said master-control valve-casing having an exhaust port; pipe-means which connect said master-control valve-casing directly to said servo-motors; a movable general control member; a master-control-member which is movable independently of said general control member; said master-control-member controlling the flow of liquid into and out of said master-control valve-casing; said master-control-member being movable to respective positions in which liquid is supplied to said servo-motors to operate them in respective opposed directions and also to shut off the flow of liquid to said servo-motors; a movable distributor-valve which is connected to said general control member; said distributor-valve controlling the distributor ports; said distributor-valve being movable to respective positions in which liquid is equally supplied to operate said servo-motors equally in the same respective direction, to supply the liquid unequally to said servo-motors to operate them unequally in said respective direction, and to supply liquid to said servo-motors to operate them in respective opposed directions.

2. Hydraulic mechanism according to claim 1, in which said servo-motors are jacks, each jack having a cylinder and a piston which is movable in its cylinder in respective opposed directions.

3. Hydraulic mechanism according to claim 1, in which said servo-motors are jacks, each jack having a cylinder and a piston which is movable in its cylinder in respective opposed directions, each piston having a releasable liquid operated locking-device associated therewith, each said locking-device being constructed and operable to change the effective liquid pressure which is required to operate its respective piston at various points in the stroke of said piston, each locking-device including a cylinder which is connected to said master-control valve-casing and a piston movable in said cylinder.

JEAN MERCIER.

REFERENCES CITED

The following references are of record in the file of this patent:

UNITED STATES PATENTS

| Number | Name | Date |
|---|---|---|
| 579,432 | Harrison | Mar. 23, 1897 |
| 1,085,964 | Briggs | Feb. 3, 1914 |
| 2,029,634 | Peter | Feb. 4, 1936 |
| 2,185,015 | Low | Dec. 26, 1939 |
| 2,218,818 | Harrington | Oct. 22, 1940 |
| 2,262,432 | Rodder | Nov. 11, 1941 |
| 2,312,432 | Mercier | Mar. 2, 1943 |
| 2,331,790 | Nichols | Oct. 12, 1943 |
| 2,343,912 | Lauck | Mar. 14, 1944 |
| 2,353,388 | Cannon | July 11, 1944 |
| 2,376,320 | Butrovich | May 22, 1945 |